United States Patent [19]

Riepl

[11] Patent Number: 5,796,192

[45] Date of Patent: Aug. 18, 1998

[54] ENERGY-SAVING ELECTRIC DRIVE FOR SMALL VEHICLES

[76] Inventor: Gerhard Riepl, Mozartstrasse 1, 88605 Messkirch, Germany

[21] Appl. No.: 520,266

[22] Filed: Aug. 28, 1995

[30] Foreign Application Priority Data

Aug. 31, 1994 [DE] Germany ............... 9414054 U

[51] Int. Cl.$^6$ .................. H02K 7/106; B60K 1/00; B60T 13/04
[52] U.S. Cl. .................. 310/67 R; 310/75 R; 310/75 C; 310/77; 310/92; 310/103; 180/65.5; 188/171
[58] Field of Search .................. 310/67 R, 103, 310/92, 75 R, 77, 75 C; 180/65.5; 188/171

[56] References Cited

U.S. PATENT DOCUMENTS

| | | | |
|---|---|---|---|
| 2,467,891 | 4/1949 | Hollander | 188/171 |
| 3,548,965 | 12/1970 | Peirro | 180/65 |
| 4,049,089 | 9/1977 | Rundle | 188/171 |
| 4,993,532 | 2/1991 | Weiss et al. | 191/111 |
| 5,121,018 | 6/1992 | Oldakowshi | 310/77 |
| 5,246,082 | 9/1993 | Alber | 180/65.5 |
| 5,274,290 | 12/1993 | Fischer | 310/93 |
| 5,465,802 | 11/1995 | Yang | 180/65.5 |

FOREIGN PATENT DOCUMENTS

| | | |
|---|---|---|
| 0 588 478 A3 | 3/1994 | European Pat. Off. . |
| 0 609 705 A1 | 8/1994 | European Pat. Off. . |
| C-213 536 | 11/1908 | Germany . |
| 254 140 A1 | 2/1988 | Germany . |
| 2 026 110 | 1/1980 | United Kingdom . |

*Primary Examiner*—Thomas M. Dougherty
*Assistant Examiner*—Tran N. Nguyen
*Attorney, Agent, or Firm*—McGlew and Tuttle

[57] ABSTRACT

An electric drive for small vehicles, especially wheelchairs, includes a d.c. motor, which is arranged as a wheelhub motor in the running wheel of the small vehicle. Efficiency and manufacturing costs are improved, while ensuring simple assembly, wherein the possibility of automatically locking the running wheels is provided, along with a short and lightweight design. The d.c. motor is an external rotor motor, whose external rotor forms the wheelhub or the wheel rim of the running wheel. The stator of the d.c. motor is stationarily connected to the small vehicle via a brake housing (3). A central spring pressure brake is provided which can be released electromagnetically and manually and brakes the external rotor of the d.c. motor in the case of a power failure.

11 Claims, 2 Drawing Sheets

ENERGY-SAVING ELECTRIC DRIVE FOR SMALL VEHICLES

FIELD OF THE INVENTION

The present invention pertains to an electric drive for small vehicles, especially wheelchairs, comprising a d.c. motor, which is arranged as a wheelhub motor in the running wheel of the small vehicle.

BACKGROUND OF THE INVENTION

A drive of this class has been known from DE-PS 41 27 257 C2. This drive is intended for a small vehicle with a frame and at least two running wheels, especially for a wheelchair, and it comprises an electric motor, a gear mechanism and a clutch as the drive part, which is intended, e.g., for a large running wheel of the wheelchair. A planet gear is used as the gear mechanism.

The components of the drive are arranged within a pot-like housing, which forms the wheelhub of the running wheel, wherein the wheelhub is mounted via a ball bearing on the toothed ring support of the planet gear. A locking clutch, which can be actuated by hand and which makes it possible to uncouple the wheelhub and the gear mechanism in the pushing operation, is provided between the planet gear and the wheelhub. The electric motor is designed as a multipole, electronically commuted, brushless d.c. motor with a permanent-magnet internal rotor, which is coupled with the planet gear arranged downstream via a corresponding drive shaft. This prior-art drive is characterized by a short overall length, so that it projects only slightly beyond the plane of the running wheel in question. A control device is also provided, which is arranged in the operating part of the wheelchair. The electric motors of the two running wheels of the wheelchair are energized by means of this control device via an electronic motor control unit, which is accommodated close to the respective motor in the corresponding running wheel hub.

Other drives for small vehicles have also been known, in which gear mechanisms of many different types are arranged downstream of the electric motors. A worm gear, a spur gear, or a bevel gear, or combinations thereof, but even roller systems for increasing the torque are used, depending on the particular application. These reducing gears are necessary in the prior-art drives to reduce the speed of the electric motor, which is usually about 1,000–3,000 rpm, to the speed of the running wheels, which is up to about 50–100 rpm.

It is common to all these drive systems that they must be composed of many individual parts, so that high material and manufacturing costs are incurred. The prior-art drives also have a high intrinsic weight. Furthermore, the gear mechanisms generate a high noise level during operation and reduce the efficiency of the entire drive due to their inner friction, which is always present.

Clutches between the running wheel and the gear mechanism must additionally be provided for uncoupling for small vehicles which must temporarily be pushed by hand, e.g., wheelchairs, in order to achieve the lowest possible resistance to pushing. Other additional assembly and material costs are generated as a result. Such gear mechanisms also require lubricant, so that the wheelhub or the gear housing must additionally be specially sealed, which also leads to higher manufacturing costs.

SUMMARY AND OBJECTS OF THE INVENTION

Thus, the basic object of the present invention is to improve an electric drive of this class in terms of its efficiency and its manufacturing costs while maintaining the possibility of simple assembly, while a possibility of automatic locking of the running wheels shall be provided, along with a short and lightweight design.

This object is attained by the d.c. motor being designed as an external rotor motor, whose external rotor forms the wheelhub or the wheel rim of the running wheel, and by the stator of the d.c. motor being stationarily connected via a brake housing to the small vehicle, and having a spring pressure brake, which can be released electromagnetically or magnetically and brakes the external rotor of the d.c. motor in the case of power failure.

By designing the d.c. motor as an external rotor motor, a reducing gear may be eliminated in the case of a corresponding number of poles, because the electric motor rotates at a correspondingly low maximum speed of about 50–100 rpm. This speed can be adjusted to different running wheel diameters by varying the number of poles and also by a corresponding electronic drive, so that a running wheel speed adapted to the running wheel diameter and consequently a sufficiently high velocity of the small vehicle can always be achieved. The d.c. motor designed according to the present invention also has a substantially higher torque than a comparable gear motor, because the loss of efficiency of the gear mechanism as well as frictional losses of the motor seals are eliminated.

The fact that the external rotor of the d.c. motor is designed at the same time as the wheelhub or the wheel rim of the running wheel leads to an extremely simple design of the drive, so that considerable savings are achieved in terms of material and assembly costs, and the drive will have a minimal intrinsic weight.

The arrangement of the brake housing directly on the stator also makes possible a lightweight, inexpensive as well as short design of the drive.

By the provision of the annular groove with a release magnet, which is designed as a ring magnet and pulls the pressing plate to release the spring pressure plate and disposing the release magnet in the brake housing opposite the stator and providing the central compression spring or plurality of springs uniformly distributed on a circular path so as to press the pressing plate together with the brake disc against the stator in the current-less state, the spring pressure brake is released on both the drive and the releasing magnet of the drive, and the small vehicle is ready to travel in the normal operating state, i.e., in the presence of a certain operating voltage. The spring pressure brake closes automatically in the case of malfunctions, e.g., power failure, so that the small vehicle is reliably braked, without the driver having to additionally respond. However, it is also advantageous during stopping that the spring pressure brake is automatically activated simply by switching off or removing the "ignition" key, so that no further activities of the operator are required during the parking of the small vehicle, either.

In the case of a malfunction, i.e., when the spring pressure brake is activated, this brake can be released manually, so that the small vehicle can simply be pushed in the case of, e.g., a dead battery. A simple and compact design is achieved due to the central arrangement of the release bar and the wedge surfaces arranged at the collar of the release bar and at the pressing plate. To release the spring pressure brake, the release bar is rotated by about 90° around its longitudinal axis, so that the wedge surfaces of the collar and of the pressing plate guided nonrotatably in the brake housing will move in relation to one another, as a result of which the pressing plate is moved in the axial direction against the spring force. Simple and reliable release of the spring pressure brake is thus guaranteed, and locking grooves, into which the wedge surfaces of the collar can snap after the rotation by 90°, so that an automatic rotation of the release bar is ruled out, may also be provided in the pressing plate.

The brake housing preferably has, on a side opposite the external rotor of the d.c. motor, a control space for accommodating a power electronic unit. The control space can be closed by means of a housing cover. A release bar preferably passes centrally through the brake housing and the control space with the housing cover, projecting to the outside.

The external rotor preferably has a pot-like design and comprises a round wheel disc with a circular, essentially cylindrical ring wall extending coaxially to the axis of rotation of the external rotor. On the cylindrical inner surface of the ring wall, a plurality of permanent magnets or electromagnets are preferably arranged as magnetic poles. The stator preferably has a central bearing hub in which the external rotor with its wheel hub shaft is mounted rotatably. The d.c. motor is preferably a multi-pole electronically commutable, brushless d.c. motor. The brake housing is preferably provided with a circular mounting flange via which the drive can be fastened to the frame of the small vehicle and a support disc is preferably provided with a radially outwardly directed supporting yoke, by which yoke the small vehicle is secured against tilting via the support wheel arranged at the outer end of the supporting yoke. The supporting disc is preferably provided on the mounting flange between the frame of the small vehicle and the brake housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
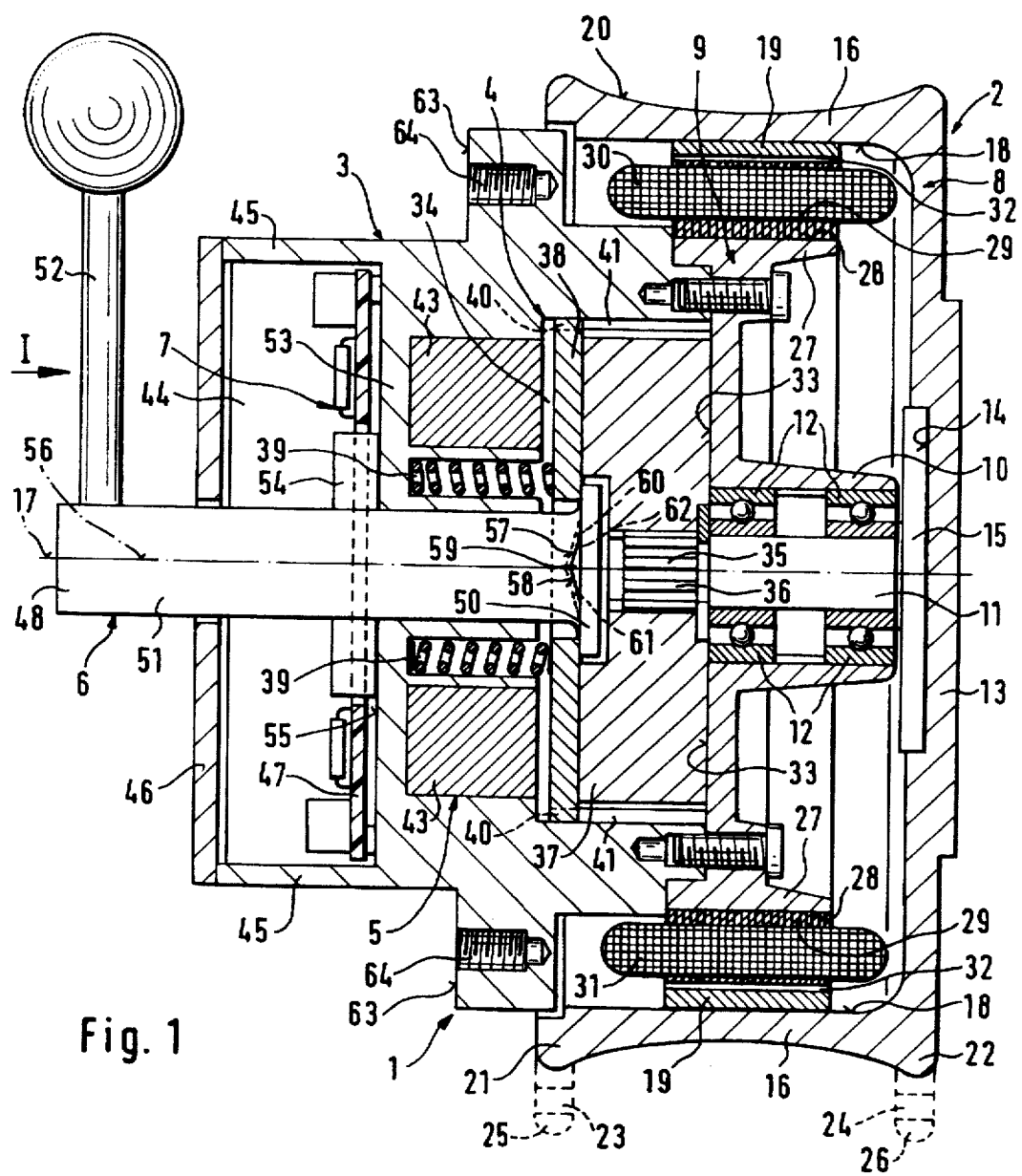
FIG. 1 is a sectional view of an electric drive.

FIG. 1 shows an electric drive 1 for small vehicles, e.g., wheelchairs, comprising a brushless d.c. motor 2, a brake housing 3, a spring pressure brake 4 with magnetic brake release means 5, a manual release means 6, and a power electronic unit 7 arranged in the brake housing 3.

The d.c. motor 2 has a pot-like external rotor 8 and an internal stator 9. The stator 9 is provided with a central bearing hub 10, in which the external rotor 8 is rotatably mounted via a wheelhub shaft 11 and two radial ball bearings 12. For its centered fastening, the external rotor 8 has a wheel disk 13, which is screwed with a corresponding recess 14 onto a mounting flange 15 of the wheelhub shaft 11 almost without clearance on the stator side. On the brake housing side, the wheel disk 13 has a circular ring wall 16, which extends coaxially to the axis of rotation 17 of the external rotor 8 and radially completely encloses the stator 9.

The cylindrical inner surface 18 of the ring wall 16 is provided with a plurality of permanent magnets 19, which form the magnet poles of the external rotor. A correspondingly large number of poles is obtained by using a correspondingly large number of permanent magnets 19, as a result of which the necessary low rated speed is obtained along with a high torque of the d.c. motor 2.

The outer jacket surface 20 of the ring wall 16 is designed as a wheel rim to accommodate a rubber tire (not shown in the drawing). If running wheels of a larger diameter are provided on a small vehicle, which may happen in the case of a wheelchair, the ring wall 16 may be provided in its axial end areas 21 and 22 with circular, radially outwardly projecting spoke webs 25, 26 (represented by broken lines), which are provided with cross holes 23, 24, so that a wheel rim of a larger diameter can be fastened to the external rotor via, e.g. spokes (not shown in the drawing), which are hung correspondingly in the cross holes 23, 24.

The stator 9 has a circular cylindrical stator support 27, which extends coaxially to the wheelhub shaft 11 and on the jacket surface 28 of which stator laminations 29 with the corresponding stator windings 30, 31 belonging to them are arranged. The inner distance between the mutually opposite permanent magnets 19 and the diameter of the stator laminations 29 are adjusted to one another such that there is a small air gap 32 between the permanent magnets 19 and the stator laminations 29. High performance capacity of the d.c. motor 2 is thus achieved at a low speed of rotation.

The stator 9 is designed as a flat disk in its radial extent, between its bearing hub 10 and its stator support 27. The stator 9 forms one of the friction surfaces of the spring pressure brake 4 with its end face 33 located toward the brake housing 3. A lightweight and compact design is achieved due to this embodiment.

The brake housing 3 is screwed onto the stator 9 opposite the external rotor 8 in a centered manner. The brake housing 3 is designed as a stepped housing both in its outer contour and in its interior space, and on the stator side, it has an essentially round brake space 34, into which the wheelhub shaft 11 with a brake housing-side coupling pin 35 extends. The coupling pin 35 of the wheelhub shaft 11 has a groove toothing 36, which is used for the nonrotatable and axially displaceable mounting of a brake disk 37. Instead of the groove toothing 36, another nonrotatable and axially displaceable mounting of the brake disk 37 on the coupling pin 35, e.g., a simple tongue-and-groove connection, may be provided as well. The brake disk 37 is fitted into the brake space 34 with a radial clearance. A pressing plate 38, which presses the brake disk 37 against the stator 9 by means of a plurality of compression springs 39 (only two of which are visible in the drawing), is provided on the brake disk 37 on the side opposite the stator 9. The compression springs 39 are arranged uniformly distributed on a circular path, so that the pressing plate 38 and consequently the brake disk 37 are pressed uniformly against the end face 33 of the stator 9. On its circumference, the pressing plate 38 has a plurality of guide lugs 40 which move guidedly on rails 41, with which the plate 38 is guided nonrotatably and axially displaceably in the brake housing 3 or in the brake space 34. Thus, the pressing plate 38 with its brake disk-side end face acts as the second friction surface of the spring pressure brake 4.

A circular ring magnet 43 is provided on the rear side of the pressing plate 38 in the brake housing 3. The pressing plate 38 is pulled against the spring forces of the compression springs 39 when the ring magnet 43 is energized, so that the brake disk 37 can freely rotate together with the wheelhub shaft 11. It is also conceivable that a central coil spring or a plate spring assembly may be provided instead of a plurality of compression springs 39 to apply the necessary pressing force to the pressing plate 38.

A control space Which is radially limited by a circular ring wall 45, is provided on the brake housing 3 on the rear side. The control space 44 can be closed by means of a housing cover 46. An electronic board 47, on which the power electronic unit 7 for driving both the ring magnet 43 and the stator windings 30, 31 is provided, is arranged in the control space 44. This power electronic unit 7 can be connected via detachable adapters to a corresponding electronic control unit of the small vehicle, which is arranged on the small vehicle. Trouble-free operation of the power electronic unit tis ensured due to the arrangement of the power electronic unit 7 in a control space 44 enclosed by metal on all sides, because the power electronic unit 7 is shielded on all sides from the outside-against electromagnetic or electric interference fields.

The manual release means 6 comprises a central release bar 48, which is arranged coaxially to the wheelhub shaft 11 and extends behind the pressing plate 38 with a circular, radially outwardly directed collar arranged at its inner bar end. The release bar 48 passes through the pressing plate 38, the brake housing 3 and the housing cover 46 from the inside to the outside, and it projects from the housing cover 46. At its outer end 51, the release bar 48 is provided with an actuating lever 52, which is arranged extending at right angles to the release bar 48. In the area of the inner partition 53 between the brake space 34 and the control space 44 of the brake housing 3, on which partition the power electronic unit 7 or its board 46 is mounted on the outside, the release bar 48 has a crossbolt 54 passing through it, with which the release bar 48 is axially supported on the outer surface 55 of the partition 53 located within the control space 44.

To manually release the spring pressure brake 4, the release bar 48 is rotated by about 90° around its longitudinal axis by means of the actuating lever 52. Elevations 59 forming wedge surfaces 57, 58, which move the pressing plate axially against the spring force of the compression springs 39 during the rotary movement in cooperation with corresponding wedge surfaces 60, 61 of depressions 62 arranged in the pressing plate 38 on the collar side, are provided on the radially projecting collar 50 on the actuating lever side or pressing plate side. For locking in the released position, locking grooves of a small axial depth, into which the elevations 59 of the collar 50 can snap, may be provided in the pressing plate 38. A plurality of elevations 59 and depressions 62 may be provided on the circumference of the web flange 50 and of the pressing plate 34, respectively, in order to reduce the frictional forces during the rotation of the release bar 48, and the release distance of the pressing plate 38 equals at most a few mm. During release, the release bar 48 is supported, with its crossbolt 54 axially stationary, on the outer surface 55 of the partition 53.

For mounting on a small vehicle, the brake housing 3 has a circular mounting flange 63, which is provided with corresponding tapholes 64 uniformly distributed on the circumference.

Figure 2:
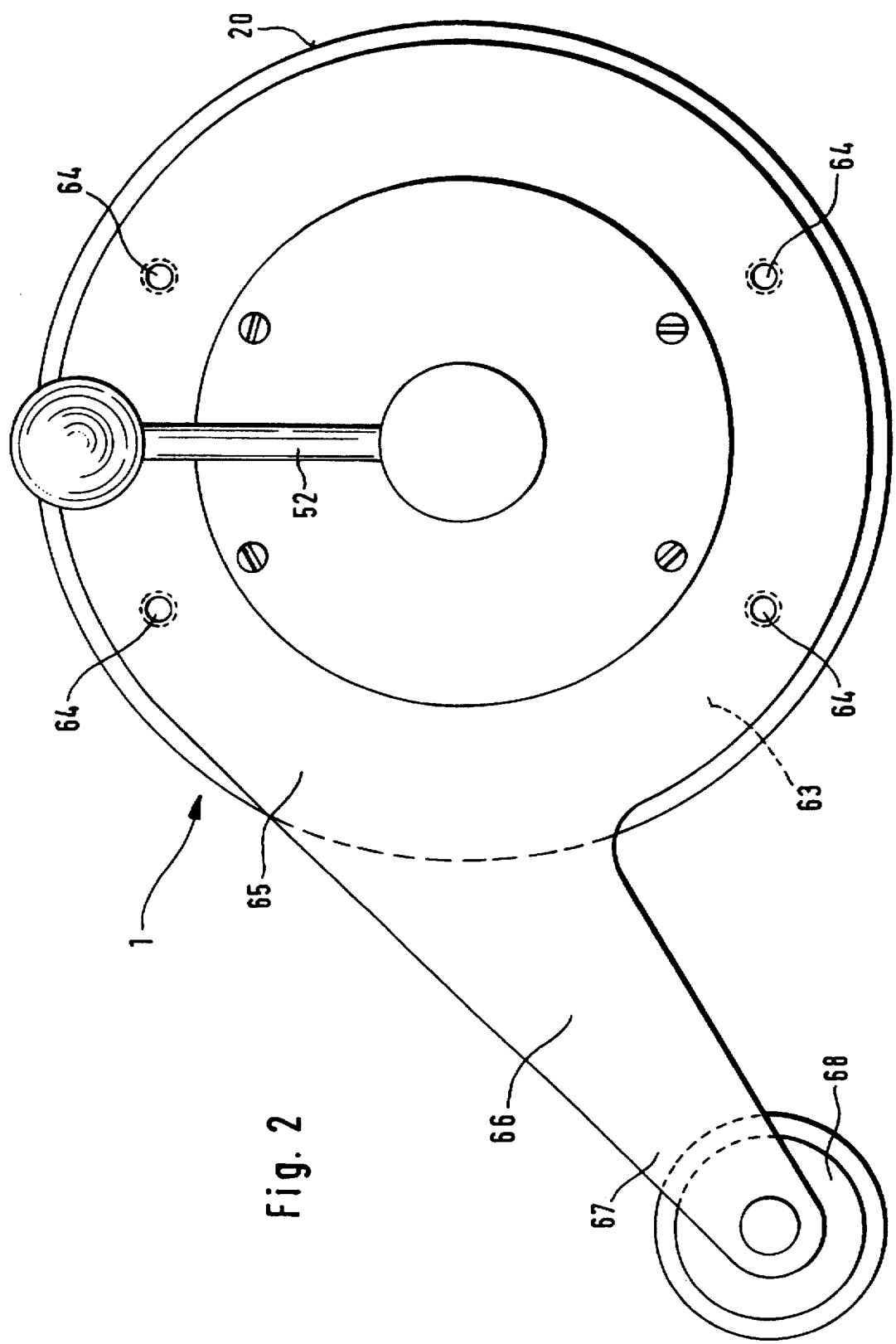
FIG. 2 is a side view I of the electric drive from FIG. 1 with the support disk and support wheel.

FIG. 2 shows a side view I of the electric drive 1 according to FIG. 1 with a support disk 65, which is arranged on the mounting flange 63 and can be fastened to the tapholes 64 of the mounting flange 63 by means of screws (not shown in the drawing). The support disk 65 is provided with a supporting yoke 66 and is provided with a support wheel 68 at its radially outer end 67. The diameter of the support disk 65 is smaller than the diameter of the outer jacket surface 20 of the ring wall 16 of the external rotor 8, so that this jacket surface can roll directly on the ground, without the support disk 65 touching the ground, if the ring wall 16 is used directly as the wheel of the small vehicle or wheelchair.

The thickness of the support disk 65 and the axial distance between the mounting flange 63 and the actuating lever 52 at the brake housing 3 are selected to be such that a sufficient space is left between the support disk 65 and the actuating lever 52 of the release bar to fasten the electric drive 1 together with the support disk 65 to the frame of a wheelchair, without the risk of jamming of the hand of a person during the actuation of the actuating lever 52.

The embodiment according to the present invention provides a lightweight, compact, high-performance drive which can be manufactured at a low cost for small vehicles, which drive has optimal efficiency. A small vehicle can be retrofitted with this electric drive in a simple manner, and its power electronic unit can be adapted, due to a corresponding design, to a possibly existing analog, digital or computer-controlled electronic control unit.

While a specific embodiment of the invention has been shown and described in detail to illustrate the application of the principles of the invention, it will be understood that the invention may be embodied otherwise without departing from such principles.

What is claimed is:

1. An electric drive for a running wheel of a small vehicles such as wheelchairs, comprising:

a small vehicle running wheel;

a d.c. motor arranged as a wheel hub motor in said running wheel, said d.c. motor including an external rotor forming one of a wheel hub or a wheel rim of said running wheel and a stator;

a brake housing, said stator being fixedly connected to said brake housing and said brake housing being fixedly connected to said small vehicle;

a central spring pressure brake disposed in said brake housing;

an electromagnetic spring brake release means for being powered to maintain said central spring pressure brake disengaged and for releasing said spring pressure brake in the case of a power failure for braking said external rotor; and manual release means for manually releasing said spring pressure brake.

2. A drive according to claim 1, wherein said external rotor is pot-shaped and includes a round wheel disc with a circular, essentially cylindrical ring wall having a cylindrical inner surface with a plurality of magnets arranged as magnetic poles, said stator having a central bearing hub, said external rotor with said wheel hub shaft being mounted rotatably on said bearing hub.

3. A drive according to claim 1, wherein said d.c. motor is a multi-pole electromagnetically commutable, brushless d.c. motor.

4. An electric drive for a running wheel of a small vehicles such as wheelchairs, comprising:

a small vehicle running wheel, a d.c. motor arranged as a wheel hub motor in said running wheel, said d.c. motor including an external rotor forming one of a wheel hub or a wheel rim of said running wheel and a stator;

a brake housing, said stator being stationarily connected to said small vehicle via said brake housing, said brake housing including a pot-shaped part fastened to said stator, on a side of said d.c. motor opposite said external rotor;

a central spring pressure brake disposed in said brake housing, said central spring pressure brake including a brake disc and a spring loaded pressing plate disposed in said housing;

a coupling pin of a wheel hub shaft of said external rotor, said brake disc being arranged on said coupling pin, said coupling pin extending into said brake housing, said brake disc being non-rotatably and axially displaceably connected to said coupling pin, said pressing plate being non-rotatably and axially displaceably guided in said brake housing;

an electromagnetic spring brake release means for being powered to maintain said central spring pressure brake disengaged and for releasing said spring pressure brake in the case of a power failure for braking said external rotor; and manual release means for manually releasing said spring pressure brake.

5. A drive according to claim 4, wherein said electromagnetic release means includes a release magnet formed as a ring magnet disposed for pulling said pressing plate in an excited state to release said spring pressure brake, said ring magnet being provided in said brake housing opposite said stator, said spring pressure brake including spring means for pressing said pressing plate together with said brake disc against said stator in a current-less state of said ring magnet, said spring means being provided within said ring magnet and comprising one of a central compression spring and a plurality of compression springs, uniformly distributed on a circular path.

6. A drive according to claim 4, wherein said manual release means includes a release bar extending coaxially to said wheel hub shaft, said release bar having a circular, radially outwardly directed collar, on said stator side, said release bar extending on said stator side behind said pressing plate through a central passage hole of said pressing plate, said release bar including a release surface for moving said pressing plate axially against a spring force of said spring means to release said spring pressure brake.

7. A drive according to claim 6, wherein said brake housing has a control space located on a side opposite said external rotor and said release bar passes centrally through said brake housing and said control space and projects to an outside of said housing.

8. A device according to claim 6, wherein said manual release means includes an actuating lever connected at an end of said release bar, which end projects from said brake housing, said actuating lever extending at right angles to said release bar, said release bar surface including axially projecting wedge surfaces provided at a collar on a pressing plate side of said release bar, said wedge surfaces extending behind said pressing plate and axially moving said pressing plate to release said spring pressure brake against a spring force in cooperation with corresponding wedge surfaces of said pressing plate when said release bar is rotated around a longitudinal axis.

9. A drive according to claim 4, wherein said brake housing is provided with a circular mounting flange for connection of said housing and said d.c. motor to said small vehicle, a support disc being provided with a radially outwardly directed supporting yoke, a support wheel being arranged on an outer end of said supporting yoke for securing said small vehicle against tilting, said supporting yoke being provided on said mounting flange between a frame of said small vehicle and said brake housing.

10. An electric drive for a running wheel of a small vehicles such as wheelchairs, comprising:

a small vehicle running wheel;

a d.c. motor arranged as a wheel hub motor in said running wheel, said d.c. motor including an external rotor forming one of a wheel hub or a wheel rim of said running wheel and a stator, a brake housing, said stator being stationarily connected to said small vehicle via said brake housing, said brake housing having a control space located on a side opposite said external rotor;

a power electronic unit disposed in said control space, said housing including a cover for opening and closing said control space;

a central spring pressure brake disposed in said brake housing;

an electromagnetic spring brake release means for being powered to maintain said central spring pressure brake disengaged and for releasing said spring pressure brake in the case of a power failure for braking said external rotor; and manual release means for manually releasing said spring pressure brake.

11. An electric drive for a running wheel of a small vehicles such as wheelchairs, comprising:

a small vehicle running wheel;

a d.c. motor arranged as a wheel hub motor in said running wheel, said d.c. motor including an external rotor forming one of a wheel hub or a wheel rim and a stator;

a brake housing, said stator being stationarily connected to said small vehicle via said brake housing, said brake housing includes a pot-shaped part fastened to said stator, on a side of said d.c. motor opposite said external rotor;

a central spring pressure brake disposed in said brake housing, said central spring pressure brake including a brake disc and a spring loaded pressing plate disposed in said housing;

a coupling pin of a wheel hub shaft of said external rotor, said brake disc being arranged on said coupling pin, said coupling pin extending into said brake housing, said brake disc being non-rotatably and axially displaceably connected to said coupling pin, said pressing plate being non-rotatably and axially displaceably guided in said brake housing;

an electromagnetic spring brake release means for being powered to maintain said central spring pressure brake disengaged and for releasing said spring pressure brake in the case of a power failure for braking said external rotor; and manual release means for manually releasing said spring pressure brake, said manual release means including a release bar extending coaxially to said wheel hub shaft, said release bar having a circular, radially outwardly directed collar, on a stator side, said release bar extending on said stator side behind said pressing plate through a central passage hole of said pressing plate, said release bar including a release surface for moving said pressing plate axially against a spring force of said spring means to release said spring pressure brake.

* * * * *